United States Patent

Ishikawa et al.

(10) Patent No.: US 10,267,416 B2
(45) Date of Patent: Apr. 23, 2019

(54) CONTROL APPARATUS

(71) Applicant: HONDA MOTOR CO., LTD., Tokyo (JP)

(72) Inventors: Yutaka Ishikawa, Wako (JP); Yuya Tachibanada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/926,091

(22) Filed: Mar. 20, 2018

(65) Prior Publication Data
US 2018/0283542 A1 Oct. 4, 2018

(30) Foreign Application Priority Data

Mar. 29, 2017 (JP) ................. 2017-065746

(51) Int. Cl.
F16H 59/64 (2006.01)
F16H 59/78 (2006.01)
F16H 61/12 (2010.01)

(52) U.S. Cl.
CPC ............. F16H 61/12 (2013.01); F16H 59/64 (2013.01); F16H 59/78 (2013.01); B60Y 2400/302 (2013.01); B60Y 2400/306 (2013.01); F16H 2061/1208 (2013.01); F16H 2061/1284 (2013.01)

(58) Field of Classification Search
None
See application file for complete search history.

(56) References Cited

U.S. PATENT DOCUMENTS

| 5,995,887 A * | 11/1999 | Hathaway | G01K 15/00 340/449 |
| 8,197,131 B2 * | 6/2012 | Kitajima | F16H 61/12 374/141 |
| 2006/0056481 A1 * | 3/2006 | Melby | G01K 15/00 374/1 |
| 2013/0116900 A1 * | 5/2013 | Yuyama | F16H 59/72 701/58 |

FOREIGN PATENT DOCUMENTS

JP 2009-228773 A 10/2009

* cited by examiner

Primary Examiner — Thomas S McCormack
(74) Attorney, Agent, or Firm — Thomas | Horstemeyer, LLP

(57) ABSTRACT

A control apparatus of an automatic transmission connected to an internal combustion engine of a vehicle includes a determination unit configured to determine an operation state of a hydraulic oil temperature sensor based on comparison between a threshold and a difference between a hydraulic oil temperature of the automatic transmission and a cooling water temperature of the internal combustion engine. When the operation state of the hydraulic oil temperature sensor is determined as normal by the comparison with the threshold, the determination unit further determines the operation state of the hydraulic oil temperature sensor based on an operation state of an oil pressure sensor determined using the hydraulic oil temperature, an oil pressure of hydraulic oil, and a rotation speed.

11 Claims, 4 Drawing Sheets

CONTROL APPARATUS

BACKGROUND OF THE INVENTION

Field of the Invention

The present invention relates to a control apparatus of an automatic transmission.

Description of the Related Art

Japanese Patent Laid-Open No. 2009-228773 discloses an arrangement that determines, based on the water temperature of engine cooling water detected by an engine water temperature detection unit and the temperature of air determined by an outside air temperature determination unit when an ignition switch is turned on, whether the oil temperature of hydraulic oil is higher than a predetermined temperature.

However, in the arrangement of Japanese Patent Laid-Open No. 2009-228773, if a fault occurs in an oil temperature sensor that detects the oil temperature of the hydraulic oil in a state in which the engine is steadily rotating at a predetermined rotation speed (defined rotation speed), a case in which occurrence of a characteristic abnormality cannot be determined may occur.

It is an object of the present invention to provide a control apparatus of an automatic transmission, which can, in a case in which a hydraulic oil temperature sensor is determined as normal based on the difference between a hydraulic oil temperature and a cooling water temperature, further determine the operation state of the hydraulic oil temperature sensor based on the operation state of an oil pressure sensor determined using the detected hydraulic oil temperature, the oil pressure of the hydraulic oil detected by the oil pressure sensor, and the rotation speed of an internal combustion engine.

SUMMARY OF THE INVENTION

According to one aspect of the present invention, there is provided a control apparatus of an automatic transmission connected to an internal combustion engine of a vehicle, comprising: a determination unit configured to determine an operation state of a hydraulic oil temperature sensor based on comparison between a threshold and a difference between a hydraulic oil temperature of the automatic transmission detected by the hydraulic oil temperature sensor and a cooling water temperature of the internal combustion engine detected by a cooling water temperature sensor, wherein when the operation state of the hydraulic oil temperature sensor is determined as normal by the comparison with the threshold, the determination unit further determines the operation state of the hydraulic oil temperature sensor based on an operation state of an oil pressure sensor determined using the hydraulic oil temperature detected by the hydraulic oil temperature sensor, an oil pressure of hydraulic oil detected by the oil pressure sensor, and a rotation speed detected by a rotation speed sensor of the internal combustion engine.

According to the present invention, it is possible to, in a case in which a hydraulic oil temperature sensor is determined as normal based on the difference between a hydraulic oil temperature and a cooling water temperature, further determine the operation state of the hydraulic oil temperature sensor based on the operation state of an oil pressure sensor determined using the detected hydraulic oil temperature, the oil pressure of the hydraulic oil detected by the oil pressure sensor, and the rotation speed of an internal combustion engine.

Further features of the present invention will become apparent from the following description of exemplary embodiments (with reference to the attached drawings).

DESCRIPTION OF THE EMBODIMENTS

A preferred embodiment of the present invention will now be described in detail with reference to the accompanying drawings. Note that the constituent elements described in the embodiment are merely examples. The technical scope of the present invention is determined by the scope of claims and is not limited by the following individual embodiment.

Figure 1:
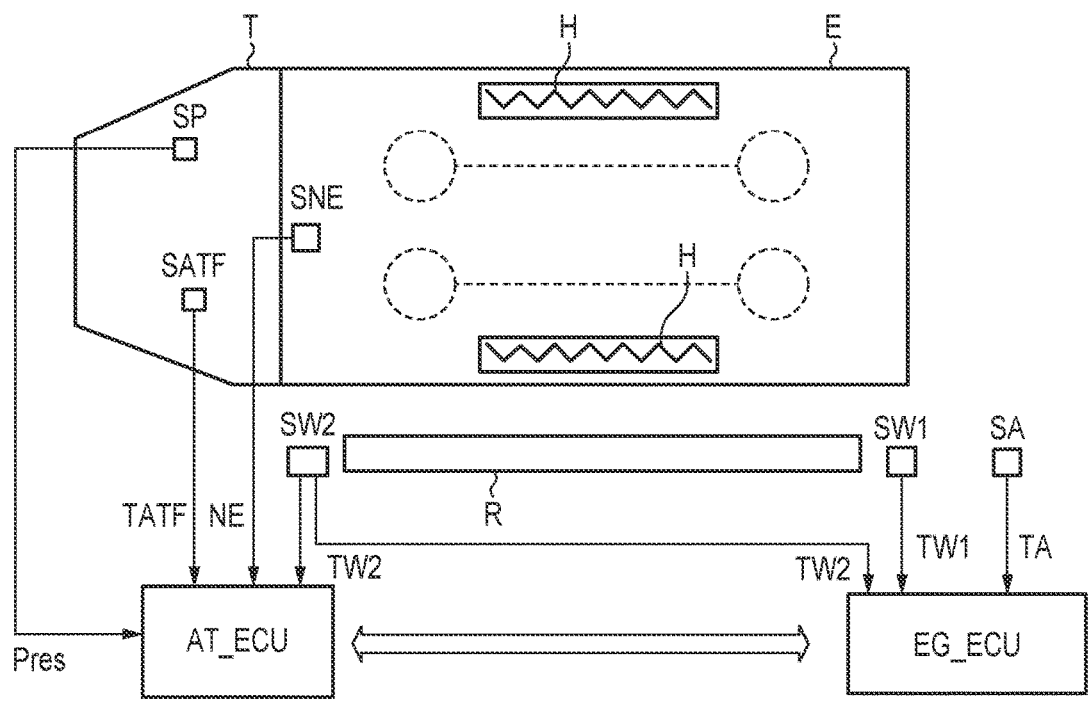
FIG. 1 is a block diagram showing the overall arrangement of a control apparatus according to an embodiment of the present invention.
Figure 2:
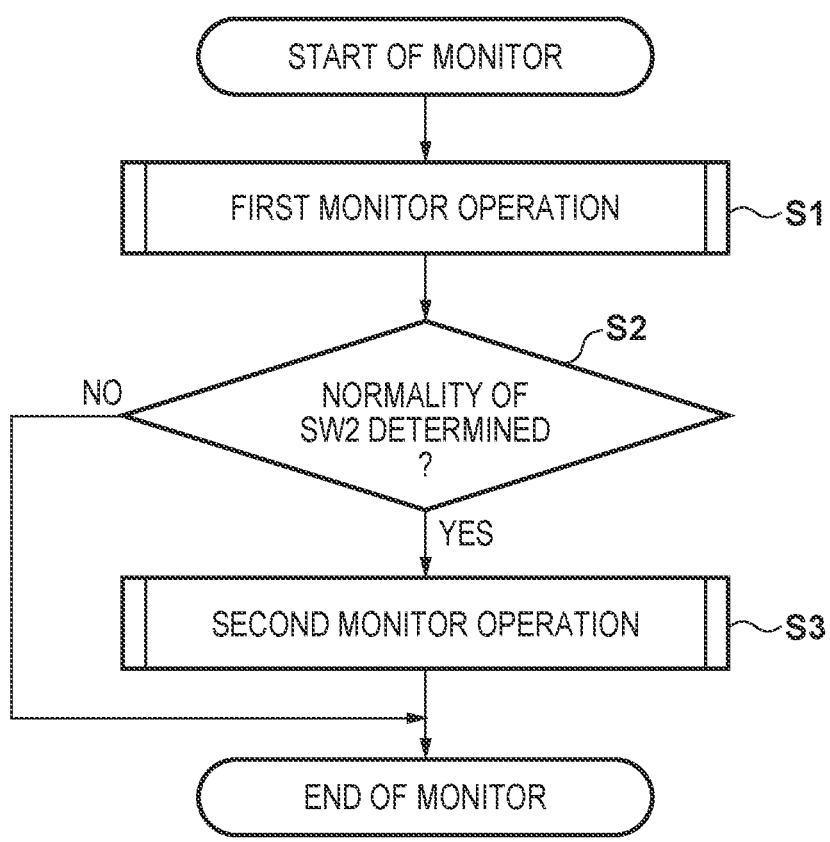
FIG. 2 is a flowchart for explaining the schematic procedure of processing of determining the operation state of an oil temperature sensor.
Figure 3:
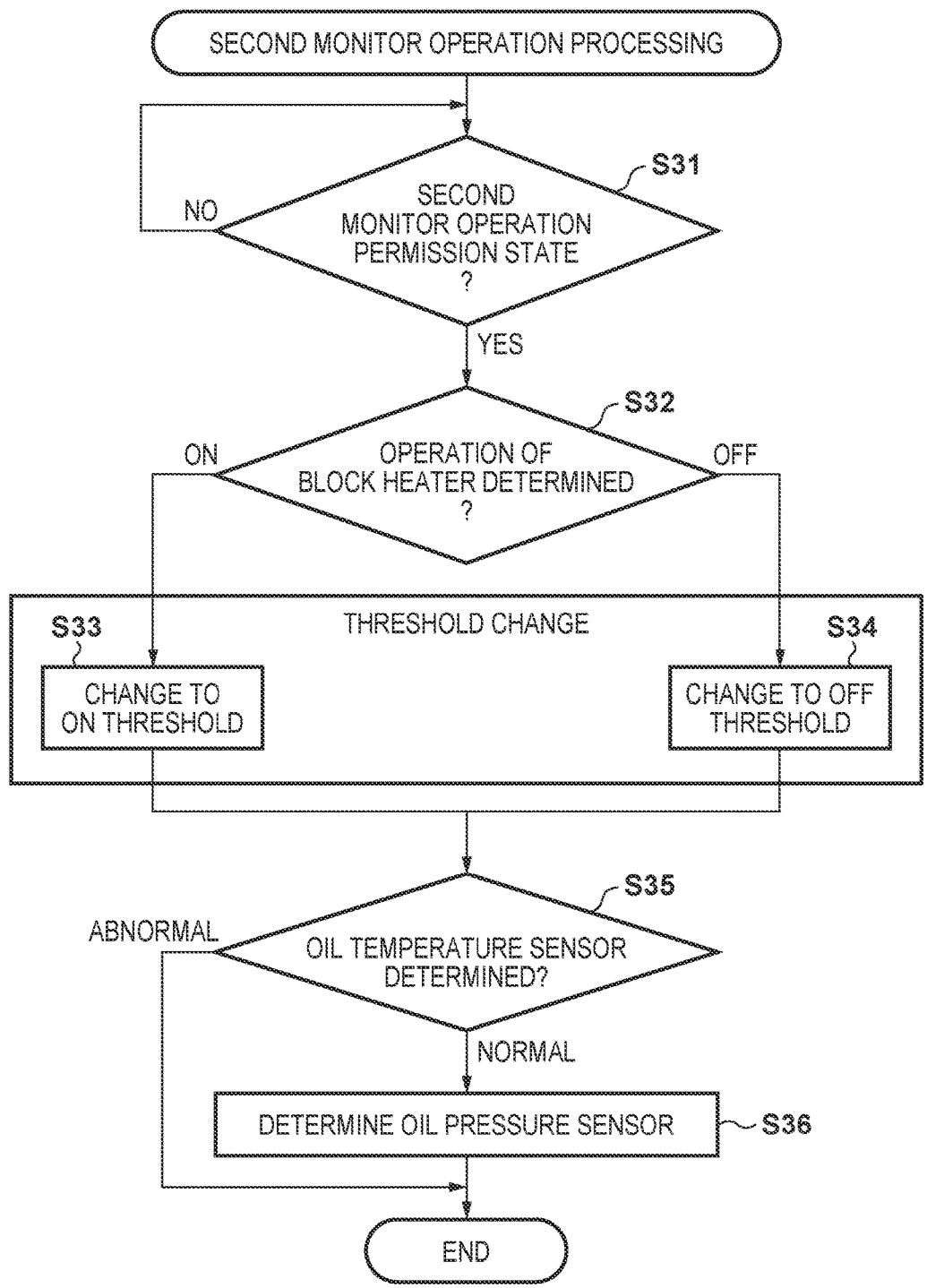
FIG. 3 is a flowchart for explaining the detailed processing procedure of second monitor processing.
Figure 4:
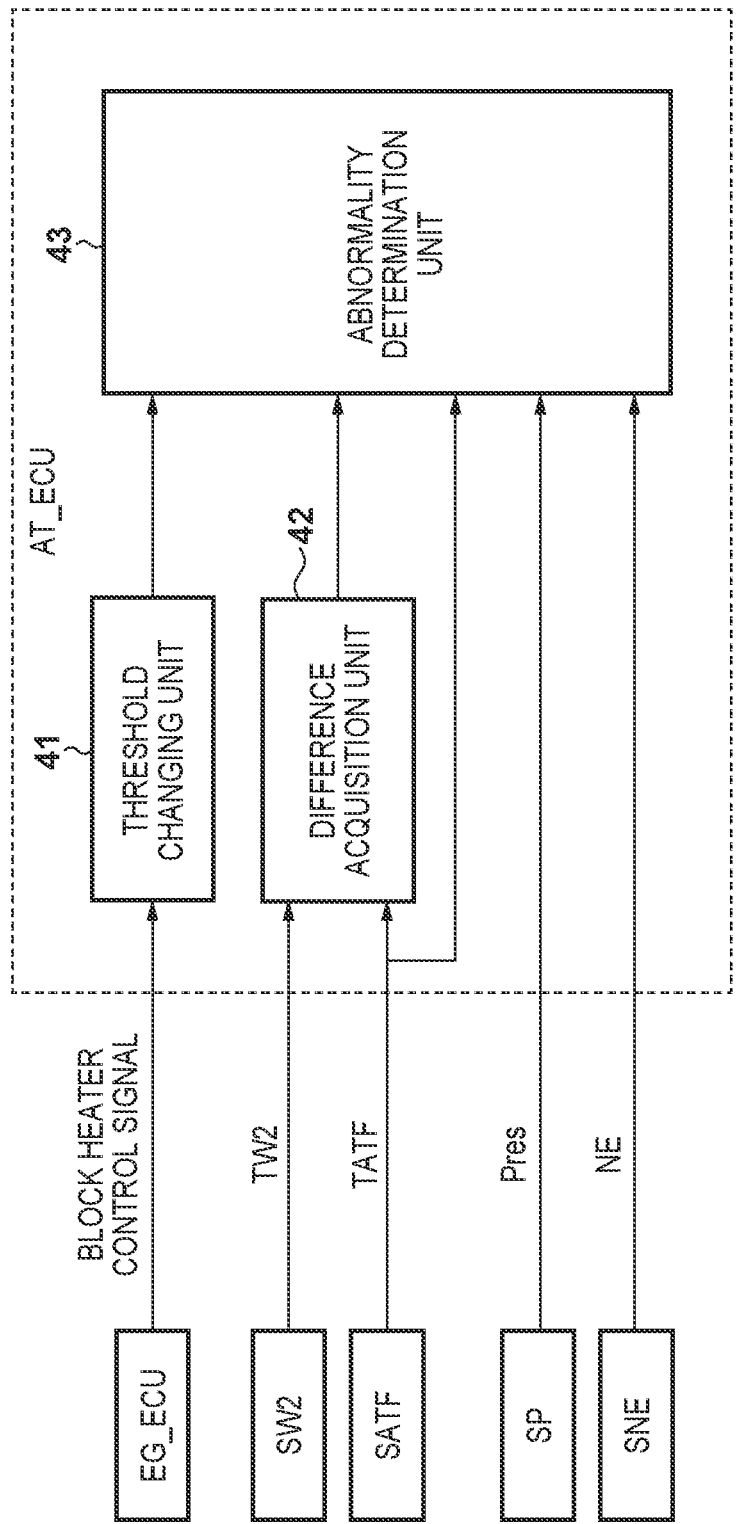
FIG. 4 is a block diagram for explaining the functional components of the control apparatus.

FIG. 1 is a block diagram showing the arrangement of a control apparatus that controls an automatic transmission connected to the internal combustion engine of a vehicle. FIG. 2 is a flowchart for explaining the schematic procedure of processing (first monitor and second monitor) of determining the operation state of an oil temperature sensor that detects the temperature of hydraulic oil. FIG. 3 is a flowchart for explaining a detailed processing procedure of second monitor operation processing shown in FIG. 2. FIG. 4 is a block diagram for explaining the functional components of the control apparatus.

As shown in FIG. 1, a radiator R of an internal combustion engine E of a vehicle is provided with a first cooling water temperature sensor SW1 that detects the water temperature (to be referred to as a "first cooling water temperature TW1" hereinafter) of cooling water on the inflow side. The radiator R is also provided with a second cooling water temperature sensor SW2 that detects the water temperature (to be referred to as a "second cooling water temperature TW2" hereinafter) of cooling water on the outflow side. Near the internal combustion engine E, an outside air temperature sensor SA that detects an outside air temperature TA is provided. In addition, a rotation speed sensor SNE that detects an output shaft rotation speed NE of the internal combustion engine E is provided. An automatic transmission T connected to the internal combustion engine E is provided with a hydraulic oil temperature sensor SATF that detects a hydraulic oil temperature TATF of the automatic transmission T and an oil pressure sensor SP that detects an oil pressure Pres of the hydraulic oil.

The first cooling water temperature TW1, the second cooling water temperature TW2, and the outside air temperature TA are input to an electronic control unit EG_ECU of the internal combustion engine E. In addition, the second cooling water temperature TW2, the output shaft rotation speed NE of the internal combustion engine E, the hydraulic oil temperature TATF, and the oil pressure Pres of the hydraulic oil are input to an electronic control unit AT_ECU of the automatic transmission T. The electronic control unit EG_ECU of the internal combustion engine E and the electronic control unit AT_ECU of the automatic transmission T are connected to be communicable with each other by a communication protocol CAN (Controller Area Network), and can share results processed in the electronic control units by communication.

FIG. 2 is a flowchart for explaining the schematic procedure of processing of determining the operation state of the oil temperature sensor (hydraulic oil temperature sensor SATF). In step S1, the electronic control unit EG_ECU of the internal combustion engine E compares the outputs of the first cooling water temperature sensor SW1, the second cooling water temperature sensor SW2, and the outside air temperature sensor SA, thereby monitoring the operation state of the second cooling water temperature sensor SW2 (first monitor operation processing).

In this step, the operation state of the second cooling water temperature sensor SW2 is determined using different parameters (the first cooling water temperature TW1 and the outside air temperature TA) as comparison targets. The electronic control unit EG_ECU determines the operation state of the second cooling water temperature sensor SW2 based on the comparison result between the second cooling water temperature TW2 and the first cooling water temperature TW1 and the comparison result between the second cooling water temperature TW2 and the outside air temperature TA.

Here, let TH1 be the first threshold used for the difference comparison between the cooling water temperatures (TW1 and TW2), and TH2 be the second threshold used for the difference comparison between the cooling water temperature (second cooling water temperature TW2) and the outside air temperature TA.

If the difference between the second cooling water temperature TW2 and the first cooling water temperature TW1 is equal to or smaller than the first threshold TH1, and the difference between the second cooling water temperature TW2 and the outside air temperature TA is equal to or smaller than the second threshold TH2, the electronic control unit EG_ECU determines the operation state of the second cooling water temperature sensor SW2 as normal (YES in step S2), and advances the process to step S3.

On the other hand, if the difference between the cooling water temperatures (TW2 and TW1) exceeds the first threshold TH1, or the difference between the cooling water temperature (second cooling water temperature TW2) and the outside air temperature TA exceeds the second threshold TH2, or the difference between the cooling water temperatures (TW2 and TW1) exceeds the first threshold TH1, and the difference between the second cooling water temperature TW2 and the outside air temperature TA exceeds the second threshold TH2, the electronic control unit EG_ECU determines the operation state of the second cooling water temperature sensor SW2 as abnormal (NO in step S2), and ends the processing.

Second monitor operation processing in step S3 will be explained next. FIG. 3 is a flowchart for explaining a detailed processing procedure of second monitor operation processing. FIG. 4 is a block diagram showing the functional components of the control apparatus. The control apparatus includes, as functional components, a threshold changing unit 41, a difference acquisition unit 42, and an abnormality determination unit 43. The functional components will be described together with the processing shown in FIG. 3.

When the electronic control unit EG_ECU of the internal combustion engine E determines the operation state of the second cooling water temperature sensor SW2 as normal (YES in step S2 of FIG. 2), in step S31 of FIG. 3, the electronic control unit AT_ECU of the automatic transmission T determines whether a second monitor operation permission state is set. Conditions to set the second monitor operation permission state include the following conditions (1) to (3). That is, the condition (1) that the engine speed is equal to or higher than a predetermined rotation speed, the condition (2) that the supply voltage of an information control unit TCU (Telematics Control Unit) connected to the electronic control unit AT_ECU is equal to or higher than a predetermined voltage (a voltage that allows the TCU and accessory devices to normally operate), and the condition (3) that a fault of a device in the automatic transmission T, a fault of a sensor (the first cooling water temperature sensor, the second cooling water temperature sensor, or the like) of the internal combustion engine E, a fault of the CAN, or the like is not detected are included in the conditions to set the second monitor operation permission state.

The electronic control unit AT_ECU of the automatic transmission T can determine the condition (1) based on the rotation speed NE detected by the rotation speed sensor SNE. In addition, a supply voltage sensor (not shown) that detects the supply voltage of the TCU or the supply voltage of an accessory device is connected to each of the TCU and the accessory devices of the TCU. The electronic control unit AT_ECU can determine the condition (2) based on the detection result of each supply voltage sensor.

The electronic control unit AT_ECU controls various kinds of actuators provided in the automatic transmission T based on the detection results of various kinds of sensors. Here, the various kinds of sensors include, for example, a sensor that detects the rotation speed of the input shaft of the automatic transmission T, a sensor that detects a shift position selected by a driver, a sensor that defects the oil pressure of hydraulic oil of an engaging mechanism that constitutes the automatic transmission T, and a sensor that detects the rotation speed of the output shaft of the automatic transmission T. Based on the detection results of the various kinds of sensors, the electronic control unit AT_ECU can detect a fault of a device in the automatic transmission T.

The electronic control unit AT_ECU can acquire the information of the sensors (the first cooling water temperature sensor, the second cooling water temperature sensor, and the like) of the internal combustion engine E from the electronic control unit EG_ECU of the internal combustion engine E, and can detect a fault of a sensor of the internal combustion engine E based on the acquired information.

Additionally, the electronic control unit EG_ECU of the internal combustion engine E and the electronic control unit AT_ECU of the automatic transmission T are connected to be communicable with each other by the communication protocol CAN (Controller Area Network). However, if mutual communication cannot be performed, or communication at a predetermined communication rate cannot be performed, each of the electronic control unit EG_ECU and the electronic control unit AT_ECU can detect a fault of the CAN. The electronic control unit AT_ECU can determine the condition (3) based on these detection results.

If all the conditions (1) to (3) are satisfied, the electronic control unit AT_ECU of the automatic transmission T determines that the second monitor operation permission state is set. If at least one of the conditions is not satisfied, the electronic control unit AT_ECU determines that the second monitor operation permission state is not set.

If the second monitor operation permission state is not set (NO in step S31), the electronic control unit AT_ECU waits until the second monitor operation permission state is set. If the second monitor operation permission state is not set even when the determination processing of step S31 is repeated a set number of times, the electronic control unit AT_ECU outputs a notification signal to notify that a second monitor operation inhibition state is set, and ends the processing. Alternatively, if, for example, the wait time exceeds a predetermined threshold time, the electronic control unit AT_ECU may output the notification signal and end the processing.

On the other hand, if all the conditions (1) to (3) are satisfied in the determination of step S31, the electronic control unit AT_ECU determines that the second monitor operation permission state is set (YES in step S31), and advances the process to step S32.

In step S32, the threshold changing unit 41 of the electronic control unit AT_ECU determines the operation state of a block heater H (heating unit) based on a control signal representing the operation state (ON or OFF) of the block heater H, which is received from the electronic control unit EG_ECU of the internal combustion engine E. The block heater H, for example, heats the engine block of the internal combustion engine E by an electric heater so as to prevent the cooling water of the internal combustion engine E from freezing. The electronic control unit EG_ECU of the internal combustion engine E transmits a control signal representing the operation state (ON or OFF) of the block heater H to the electronic control unit AT_ECU of the automatic transmission T. The threshold changing unit 41 of the electronic control unit AT_ECU determines the operation state of the block heater H based on the control signal.

If the block heater H is operating in the determination of step S32 (ON in step S32), the threshold changing unit 41 advances the process to step S33. If the block heater H is not operating (OFF in step S32), the threshold changing unit 41 advances the process to step S34.

In step S33 or S34, the threshold changing unit 41 of the electronic control unit AT_ECU changes the threshold based on the determination result of the operation state of the block heater H. This threshold is a threshold used for difference comparison between the hydraulic oil temperature TATF of the automatic transmission T and the water temperature (second cooling water temperature TW2) of the cooling water on the outflow side of the radiator R in oil temperature sensor determination of step S35 later.

When the block heater H operates and heats the engine block, the water temperature (second cooling water temperature TW2) of the cooling water on the outflow side of the radiator R or the automatic transmission T connected to the engine bock is heated by the heat, and the hydraulic oil temperature TATF rises. To accurately perform oil temperature sensor determination based on the difference comparison between the hydraulic oil temperature TATF and the second cooling water temperature TW2, the threshold changing unit 41 changes the threshold serving as the reference based on the determination result of the operation state of the block heater H.

If the block heater H is operating, in step S33, the threshold changing unit 41 sets a threshold (ON threshold) in the operating state of the block heater H, and advances the process to step S35. In addition, if the block heater H is not operating, in step S34, the threshold changing unit 41 sets a threshold (OFF threshold) in the non-operating state of the block heater H, and advances the process to step S35.

In step S35, the difference acquisition unit 42 of the electronic control unit AT_ECU acquires the difference between the hydraulic oil temperature TATF detected by the hydraulic oil temperature sensor SATF and the second cooling water temperature TW2 detected by the second cooling water temperature sensor SW2, and outputs the acquired difference to the abnormality determination unit 43.

Based on the threshold changed in step S33 or S34 and the difference acquired by the difference acquisition unit 42, the abnormality determination unit 43 compares the difference between the hydraulic oil temperature TATF and the second cooling water temperature TW2 with the threshold, and determines based on the result of the difference comparison whether the operation state of the hydraulic oil temperature sensor SATF is normal.

(a) When Block Heater H is Operating

The ON threshold changed in step S33 is used for difference comparison. If the difference between the hydraulic oil temperature TATF of the automatic transmission T and the second cooling water temperature TW2 is a difference temperature smaller than the ON threshold, the abnormality determination unit 43 determines the operation state of the hydraulic oil temperature sensor SATF as normal.

Additionally, if the difference between the hydraulic oil temperature TATF of the automatic transmission T and the second cooling water temperature TW2 is a difference temperature equal to or larger than the ON threshold, the abnormality determination unit 43 determines the operation state of the hydraulic oil temperature sensor SATF as abnormal.

(b) When Block Heater H is not Operating

The OFF threshold changed in step S34 is used for difference comparison. If the difference between the hydraulic oil temperature TATF of the automatic transmission T and the second cooling water temperature TW2 is a difference temperature smaller than the OFF threshold, the abnormality determination unit 43 determines the operation state of the hydraulic oil temperature sensor SATF as normal.

Additionally, if the difference between the hydraulic oil temperature TATF of the automatic transmission T and the second cooling water temperature TW2 is a difference temperature equal to or larger than the OFF threshold, the abnormality determination unit 43 determines the operation state of the hydraulic oil temperature sensor SATF as abnormal. Here, the relationship between the ON threshold and the OFF threshold is ON threshold>OFF threshold.

If the operation state of the hydraulic oil temperature sensor SATF is abnormal in the determination processing of step S35 (abnormal in step S35), the processing ends. On the other hand, if the operation state of the hydraulic oil temperature sensor SATF is normal in the determination processing of step S35 (normal in step S35), the abnormality determination unit 43 advances the process to step S36.

In step S36, the abnormality determination unit 43 performs redundancy determination based on the oil pressure sensor value. When the hydraulic oil temperature sensor SATF exhibits a high oil temperature value more than a predetermined value, to determine whether the value is correct (whether the value is an abnormal value based on a fault or not), the abnormality determination unit 43 performs redundancy determination using the oil pressure Pres (oil pressure sensor value) detected by the oil pressure sensor SP. When the operation state of the hydraulic oil temperature sensor SATF is determined as normal by the comparison with the threshold in step S35, the operation state of the hydraulic oil temperature sensor SATF is further determined based on the operation state of the oil pressure sensor SP determined using the hydraulic oil temperature TATF detected by the hydraulic oil temperature sensor, the oil pressure Pres of the hydraulic oil detected by the sensor SP, and the rotation speed NE detected by the rotation speed sensor SNE.

When the hydraulic oil temperature TATF detected by the hydraulic oil temperature sensor SATF exhibits a high oil temperature value more than a predetermined value, the oil pressure is not output as instructed in rotation at a low engine speed lower than a predetermined engine speed even in a high pressure instructed state more than a predetermined oil pressure.

When the hydraulic oil temperature TATF exhibits a high oil temperature value more than a predetermined value, the rotation speed NE detected by the rotation speed sensor SNE is equal to or lower than a predetermined engine speed (Nref), and a high pressure instructed state more than a predetermined oil pressure is set, if the oil pressure Pres (oil pressure sensor value) detected by the oil pressure sensor SP is equal to or higher than a predetermined oil pressure (Pref1), the abnormality determination unit 43 determines the operation state of the oil pressure sensor SP as abnormal. When determining the operation state of the oil pressure sensor SP as abnormal, the abnormality determination unit 43 determines the operation state of the hydraulic oil temperature sensor SATF as abnormal. According to the arrangement that performs the determination in this way, it is possible to avoid a high temperature determination error caused by a fault of the hydraulic oil temperature sensor SATF without newly adding a sensor.

On the other hand, if the oil pressure Pres (oil pressure sensor value) detected by the oil pressure sensor SP under the same condition is lower than the predetermined oil pressure (Pref1), the abnormality determination unit 43 determines the operation state of the oil pressure sensor SP as normal. When determining the operation state of the oil pressure sensor SP as normal, the abnormality determination unit 43 determines the operation state of the hydraulic oil temperature sensor SATF as normal.

Similarly, when the hydraulic oil temperature TATF detected by the hydraulic oil temperature sensor SATF exhibits a low oil temperature value less than a predetermined value, the oil pressure is not output as instructed in rotation at a low engine speed lower than a predetermined engine speed even in a low pressure instructed state less than a predetermined oil pressure.

When the hydraulic oil temperature TATF exhibits a low oil temperature value less than a predetermined value, the rotation speed NE detected by the rotation speed sensor SNE is equal to or lower than the predetermined engine speed (Nref), and a low pressure instructed state is set, if the oil pressure Pres (oil pressure sensor value) detected by the oil pressure sensor SP is equal to or higher than a predetermined oil pressure (Pref2), the abnormality determination unit 43 determines the operation state of the oil pressure sensor SP as normal. When determining the operation state of the oil pressure sensor SP as normal, the abnormality determination unit 43 determines the operation state of the hydraulic oil temperature sensor SATF as normal.

On the other hand, if the oil pressure Pres (oil pressure sensor value) detected by the oil pressure sensor SP under the same condition is lower than the predetermined oil pressure (Pref2), the abnormality determination unit 43 determines the operation state of the oil pressure sensor SP as abnormal. When determining the operation state of the oil pressure sensor SP as abnormal, the abnormality determination unit 43 determines the operation state of the hydraulic oil temperature sensor SATF as abnormal.

<Summary of Embodiment>

Arrangement 1. A control apparatus (for example, AT_ECU) according to the above embodiment is a control apparatus of an automatic transmission (T) connected to an internal combustion engine (E) of a vehicle, characterized by comprising:

a determination unit (for example, 43) configured to determine an operation state of a hydraulic oil temperature sensor based on comparison between a threshold and a difference between a hydraulic oil temperature (for example, TATF) of the automatic transmission detected by the hydraulic oil temperature sensor (for example, SATF) and a cooling water temperature (for example, TW2) of the internal combustion engine detected by a cooling water temperature sensor (for example, SW2), wherein when the operation state of the hydraulic oil temperature sensor is determined as normal by the comparison with the threshold (for example, normal in S35 of FIG. 3), the determination unit further determines the operation state of the hydraulic oil temperature sensor based on an operation state of an oil pressure sensor (for example, SP) determined using the hydraulic oil temperature detected by the hydraulic oil temperature sensor, an oil pressure (Pres) of hydraulic oil detected by the oil pressure sensor, and a rotation speed (for example, NE) detected by a rotation speed sensor (for example, SNE) of the internal combustion engine (for example, S36 of FIG. 3).

According to the embodiment of arrangement 1, when the hydraulic oil temperature sensor is determined as normal based on the difference between the hydraulic oil temperature and the cooling water temperature, the operation state of the hydraulic oil temperature sensor can further be determined based on the operation state of the oil pressure sensor determined using the detected hydraulic oil temperature, the oil pressure of the hydraulic oil detected by the oil pressure sensor, and the rotation speed of the internal combustion engine.

Arrangement 2. The control apparatus (for example, AT_ECU) according to the above embodiment is characterized by further comprising a difference acquisition unit (for example, 42) configured to acquire a difference between the hydraulic oil temperature of the automatic transmission detected by the hydraulic oil temperature sensor and the cooling water temperature of the internal combustion engine detected by the cooling water temperature sensor, wherein when the difference is not less than a threshold, the determination unit determines the operation state of the hydraulic oil temperature sensor as abnormal (for example, abnormal in step S35 of FIG. 3), and when the difference is less than the threshold, the determination unit determines the operation state of the hydraulic oil temperature sensor as normal (for example, normal in step S35 of FIG. 3).

According to the embodiment of arrangement 2, it is possible to determine the operation state of the hydraulic oil temperature sensor by comparison with the threshold.

Arrangement 3. The control apparatus (for example, AT_ECU) according to the above embodiment is characterized by further comprising a threshold changing unit (for example, 41) configured to, based on a control signal representing an operation state of a heating unit (for example, H) provided in the internal combustion engine, change the threshold to one of a threshold (for example, ON threshold in S33 of FIG. 3) in a case in which the heating unit operates and a threshold (for example, OFF threshold in S34 of FIG. 3) in a case in which the heating unit does not operate.

According to the embodiment of arrangement 3, it is possible to set a threshold according to the operation state of the heating unit provided in the internal combustion engine.

Arrangement 4. The control apparatus (for example, AT_ECU) according to the above embodiment is characterized in that when the hydraulic oil temperature exhibits a high oil temperature value more than a predetermined value, the rotation speed detected by the rotation speed sensor of the internal combustion engine is not more than a predetermined engine speed, and a high pressure instructed state more than a predetermined oil pressure is set, if the oil pressure detected by the oil pressure sensor is not less than a predetermined oil pressure, the determination unit determines the operation state of the oil pressure sensor as abnormal.

Arrangement 5. The control apparatus (for example, AT_ECU) according to the above embodiment is characterized in that when the hydraulic oil temperature exhibits a high oil temperature value more than a predetermined value, the rotation speed detected by the rotation speed sensor of the internal combustion engine is not more than a predetermined engine speed, and a high pressure instructed state more than a predetermined oil pressure is set, if the oil pressure detected by the oil pressure sensor is less than a predetermined oil pressure, the determination unit determines the operation state of the oil pressure sensor as normal.

Arrangement 6. The control apparatus (for example, AT_ECU) according to the above embodiment is characterized in that when the hydraulic oil temperature exhibits a low oil temperature value less than a predetermined value, the rotation speed detected by the rotation speed sensor of the internal combustion engine is not more than a predetermined engine speed, and a low pressure instructed state less than a predetermined oil pressure is set, if the oil pressure detected by the oil pressure sensor is not less than a predetermined oil pressure, the determination unit determines the operation state of the oil pressure sensor as normal.

Arrangement 7. The control apparatus (for example, AT_ECU) according to the above embodiment is characterized in that when the hydraulic oil temperature exhibits a low oil temperature value less than a predetermined value, the rotation speed detected by the rotation speed sensor of the internal combustion engine is not more than a predetermined engine speed, and a low pressure instructed state less than a predetermined oil pressure is set, if the oil pressure detected by the oil pressure sensor is less than a predetermined oil pressure, the determination unit determines the operation state of the oil pressure sensor as abnormal.

According to the embodiments of arrangements 4 to 7, it is possible to determine the operation state of the oil pressure sensor using the detected hydraulic oil temperature, the oil pressure of the hydraulic oil detected by the oil pressure sensor, and the rotation speed of the internal combustion engine.

Arrangement 8. The control apparatus (for example, AT_ECU) according to the above embodiment is characterized in that when determining the operation state of the oil pressure sensor as normal, the determination unit determines the operation state of the hydraulic oil temperature sensor as normal.

Arrangement 9. The control apparatus (for example, AT_ECU) according to the above embodiment is characterized in that when determining the operation state of the oil pressure sensor as abnormal, the determination unit determines the operation state of the hydraulic oil temperature sensor as abnormal.

According to the embodiments of arrangements 8 and 9, it is possible to further determine the operation state of the hydraulic oil temperature sensor based on the operation state of the oil pressure sensor determined using the detected hydraulic oil temperature, the oil pressure of the hydraulic oil detected by the oil pressure sensor, and the rotation speed of the internal combustion engine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-065746, filed Mar. 29, 2017, which is hereby incorporated by reference herein in its entirety.

What is claimed is:

1. A control apparatus of an automatic transmission connected to an internal combustion engine of a vehicle, comprising:
   a determination unit configured to determine an operation state of a hydraulic oil temperature sensor based on comparison between a threshold and a difference between a hydraulic oil temperature of the automatic transmission detected by the hydraulic oil temperature sensor and a cooling water temperature of the internal combustion engine detected by a cooling water temperature sensor,
   wherein when the operation state of the hydraulic oil temperature sensor is determined as normal by the comparison with the threshold, the determination unit further determines the operation state of the hydraulic oil temperature sensor based on an operation state of an oil pressure sensor determined using the hydraulic oil temperature detected by the hydraulic oil temperature sensor, an oil pressure of hydraulic oil detected by the oil pressure sensor, and a rotation speed detected by a rotation speed sensor of the internal combustion engine.

2. The apparatus according to claim 1, further comprising a difference acquisition unit configured to acquire a difference between the hydraulic oil temperature of the automatic transmission detected by the hydraulic oil temperature sensor and the cooling water temperature of the internal combustion engine detected by the cooling water temperature sensor,
   wherein when the difference is not less than a threshold, the determination unit determines the operation state of the hydraulic oil temperature sensor as abnormal, and when the difference is less than the threshold, the determination unit determines the operation state of the hydraulic oil temperature sensor as normal.

3. The apparatus according to claim 1, further comprising a threshold changing unit configured to, based on a control signal representing an operation state of a heating unit provided in the internal combustion engine, change the threshold to one of a threshold in a case in which the heating unit operates and a threshold in a case in which the heating unit does not operate.

4. The apparatus according to claim 1, wherein when the hydraulic oil temperature exhibits a high oil temperature value more than a predetermined value, the rotation speed detected by the rotation speed sensor of the internal combustion engine is not more than a predetermined engine speed, and a high pressure instructed state more than a predetermined oil pressure is set, if the oil pressure detected by the oil pressure sensor is not less than a predetermined oil pressure, the determination unit determines the operation state of the oil pressure sensor as abnormal.

5. The apparatus according to claim 1, wherein when the hydraulic oil temperature exhibits a high oil temperature value more than a predetermined value, the rotation speed detected by the rotation speed sensor of the internal combustion engine is not more than a predetermined engine speed, and a high pressure instructed state more than a predetermined oil pressure is set, if the oil pressure detected by the oil pressure sensor is less than a predetermined oil pressure, the determination unit determines the operation state of the oil pressure sensor as normal.

6. The apparatus according to claim 1, wherein when the hydraulic oil temperature exhibits a low oil temperature value less than a predetermined value, the rotation speed detected by the rotation speed sensor of the internal combustion engine is not more than a predetermined engine speed, and a low pressure instructed state less than a predetermined oil pressure is set, if the oil pressure detected by the oil pressure sensor is not less than a predetermined oil pressure, the determination unit determines the operation state of the oil pressure sensor as normal.

7. The apparatus according to claim 1, wherein when the hydraulic oil temperature exhibits a low oil temperature value less than a predetermined value, the rotation speed detected by the rotation speed sensor of the internal combustion engine is not more than a predetermined engine speed, and a low pressure instructed state less than a predetermined oil pressure is set, if the oil pressure detected by the oil pressure sensor is less than a predetermined oil pressure, the determination unit determines the operation state of the oil pressure sensor as abnormal.

8. The apparatus according to claim 5, wherein when determining the operation state of the oil pressure sensor as normal, the determination unit determines the operation state of the hydraulic oil temperature sensor as normal.

9. The apparatus according to claim 6, wherein when determining the operation state of the oil pressure sensor as normal, the determination unit determines the operation state of the hydraulic oil temperature sensor as normal.

10. The apparatus according to claim 4, wherein when determining the operation state of the oil pressure sensor as abnormal, the determination unit determines the operation state of the hydraulic oil temperature sensor as abnormal.

11. The apparatus according to claim 7, wherein when determining the operation state of the oil pressure sensor as abnormal, the determination unit determines the operation state of the hydraulic oil temperature sensor as abnormal.

* * * * *